May 19, 1925.
R. G. THOMAS ET AL
MEANS FOR INCLOSING AND READILY DISPLAYING
WHEN REQUIRED A RECORD OF INFORMATION
Filed May 8, 1924
1,538,071
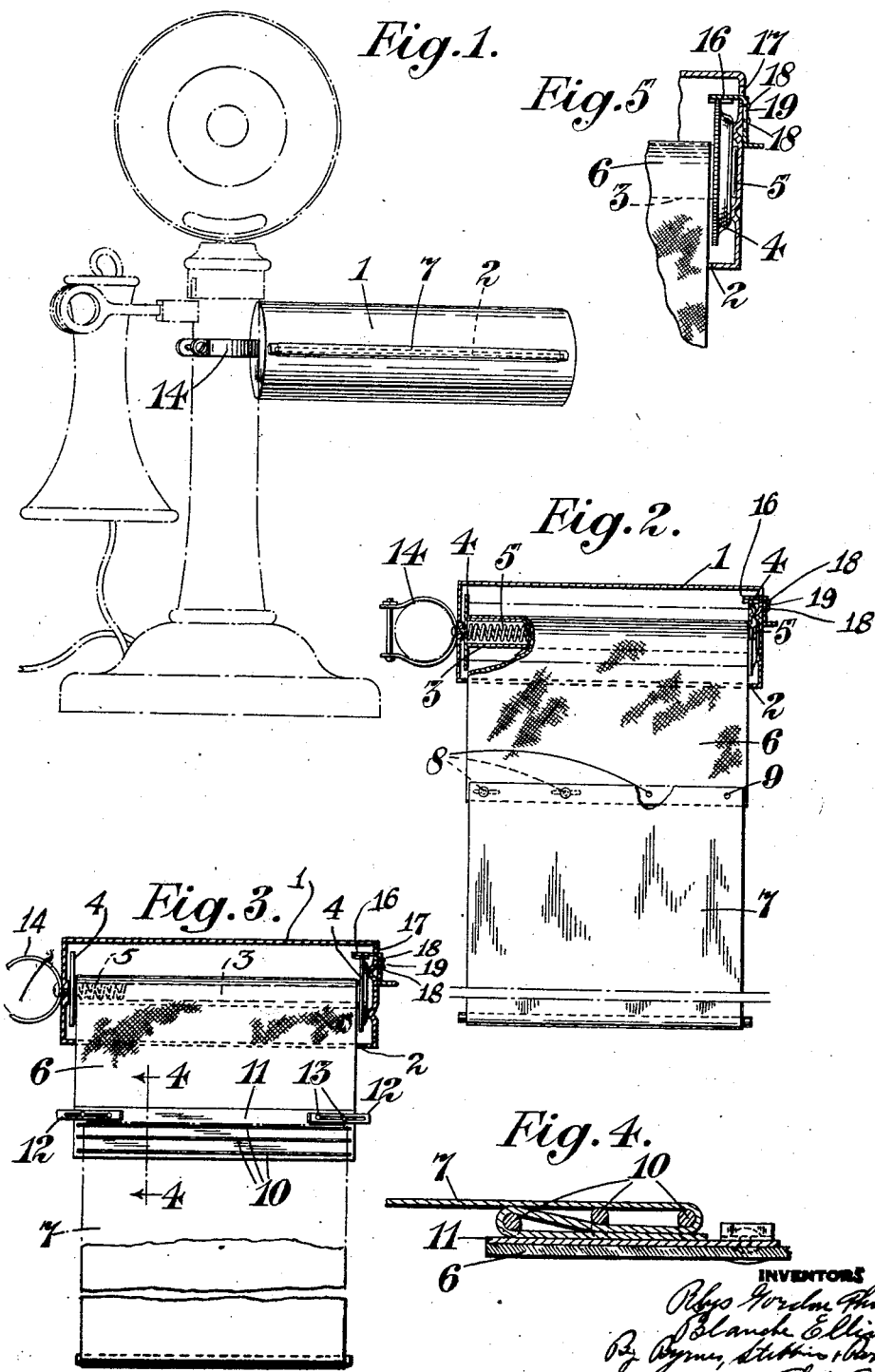

Patented May 19, 1925.

1,538,071

UNITED STATES PATENT OFFICE.

RHYS GORDON THOMAS AND BLANCHE ELLIOTT, OF LONDON, ENGLAND.

MEANS FOR INCLOSING AND READILY DISPLAYING WHEN REQUIRED A RECORD OF INFORMATION.

Application filed May 8, 1924. Serial No. 711,796.

*To all whom it may concern:*

Be it known that we, RHYS GORDON THOMAS and (Miss) BLANCHE ELLIOTT, subjects of the King of England, residing at London, England, have invented certain new and useful Improvements in Means for Inclosing and Readily Displaying When Required a Record of Information, of which the following is a specification.

This invention relates to means for inclosing and readily displaying when required a record of information and has for its principal object to provide a device for inclosing and displaying a record of those telephone addresses which may happen to be mose frequently required than others.

According to the invention there is provided a device for inclosing and readily displaying when required a record of telephone addresses or other information, comprising a protective casing having a slit in one of its walls for the passage into and out from the casing of a strip of flexible material for the record, a rotatable member within the casing, means for anchoring to said member a strip of flexible material for the record, and means for rotating said member so as to draw the flexible strip into the casing.

The construction may be such that a flexible record-strip may be attached to the rotatable member aforesaid by means of an intermediate tongue secured to the rotatable member and capable of being extended out through the slit in the casing.

Preferably, the rotatable member is provided with means such as a helical spring contained within it for rotating the member automatically in a direction to draw the record-strip into the casing.

The device according to one feature of the invention may be provided with means for frictionally securing it to the upright stem of a table telephone. It may, however, be formed and adapted to serve incidentally as a paper-weight, or again the device may be provided with means for securing it in a convenient position to a wall or a desk.

The invention will be further understood from the following description of one method of carrying it into effect with reference to the accompanying drawings.

In these drawings

Figure 1 represents a view in perspective of a device according to the invention provided with means for attaching it frictionally to a table telephone, Figures 2, 3 and 4 illustrate diagrammatically alternative methods of attaching a record strip to the device, and Figure 5 is a sectional view, on a larger scale, of one end portion of the device.

The device comprises a cylindrical metal casing 1 closed at both ends and provided with a slit 2 extending almost from end to end of the casing. Rotatably mounted within the casing is a hollow metallic spool 3 provided with end flanges 4. Inclosed within this spool is a helical spring 5 secured at one end to the interior of the spool and at the other end to the casing so that upon rotating the spool in one direction the spring becomes wound and tends to rotate the spool back again in the opposite direction.

Attached to the spool is a tongue 6 of flexible material, preferably linen, which is long enough to extend from the spool out through the slit 2 in the casing. To this flexible tongue may be secured a strip 7 of flexible material, say linen or paper, upon which the telephone addresses or other required information can be marked.

The attachment of the record-strip to the tongue may be effected in a variety of ways.

Figure 2 illustrates one method of attachment wherein the tongue is provided along its free edge with a series of metallic eyelets 8 with which register another series of holes or metallic eyelets 9 along the edge of the inner end of the record-strip and the record-strip and tongue are engaged by small paper fasteners passed through these holes and bent over in the ordinary way.

Figures 3 and 4 illustrate another method of attachment wherein the tongue 6 is provided with a series of wires 10 extending transversely across the tongue and parallel to one another. These wires may be soldered or otherwise secured to a narrow thin metal edge-piece 11 extending along the free edge of the tongue and conveniently secured, for example, by sewing thereto. The end of the flexible record-strip is frictionally attached to the tongue 6 by being threaded over and under these wires. For example, the strip may be carried over the three wires from the free edge of the tongue, then under the rear and middle wires, over the front wire and then back again under the three wires. The manner of threading, however, can be varied as found most suitable.

The latter method of attaching the record strip is preferable where a paper strip is employed and the former method is more desirable where a linen strip is employed. In the case of business telephones where the device will be frequently in use it would be desirable to employ a linen record strip since linen is more durable than paper. It may be found, moreover, that where a record of business addresses is required, the record occasionally requires to be modified or an entirely fresh record is required to be made. Whether the strip be of paper or linen the information can be conveniently marked on it by passing the strip through a typewriting machine. If, on the other hand, as in the case of private telephones, the record is not so frequently in use the record-strip may quite conveniently be of paper in which event the addresses may be marked in pencil and any alterations to the record can be effected by erasing the pencil markings.

Figure 3 shows the device with the flexible tongue extended out through the slit so that a record-strip may be attached to it. In order to prevent the helical spring within the spool from drawing the free edge of the tongue out of reach within the casing, the tongue may be provided at each side with a stop in the form of a small sliding bolt which may be pushed out to project beyond the side edges of the tongue so as to engage the outside of the casing beyond the ends of the slit therein. These stop members are necessarily small and may take the form of small slotted strips of sheet metal 12 guided by headed pins 13.

In order to prevent the record-strip from being drawn completely into the casing it is preferably provided with some form of stop at its free end. This stop may conveniently take the form of a thin wooden lath gummed to the free end of the strip and of such dimensions as not to pass through the slit 2 in the casing.

The casing 1 is provided at one end with a clasp 14 to embrace the vertical stem of an ordinary table telephone and frictionally engage it. This clasp may be in the form of a spring-clip or it may, as shown, be provided with screw-tightening means at its free extremities so as rigidly to clamp the device on to the telephone stem.

Retaining means may be provided for holding the strip when drawn out to any extent, and a coiled spring may be employed at one end of the spool instead of an inclosed helical spring.

The retaining means may engage the spool, say, at one end thereof. Figure 5 illustrates such an arrangement. One end 15 of the spool 3 is toothed or heavily milled around its periphery and is engaged against rotation by means of a small sheet-metal stop 16. The stop 16 is carried on the outside of the casing and is bent to project at one end into the casing through an opening 17 therein, and the projecting portion is formed so as effectively to engage the milled edge of the spool and retain the spool against rotation. The stop is arranged to slide radially in the spool and is mounted on two headed pins 18 which are soldered or otherwise secured to the casing end and extend through a slot 19 in the stop. When such retaining means are embodied, obviously they may be employed to retain temporarily the tongue 6 in a position of extension through the slit in the casing, and the previously described means for accomplishing this may be dispensed with.

We claim:—

1. A device for inclosing and readily displaying when required a record of telephone addresses or other information, comprising a protective casing having a slit in one of its walls for the passage into and out of the casing of a flexible strip for the record, a rotatable member within the casing, a tongue of flexible material secured at one end to the rotatable member and capable of extending therefrom at the other end through the slit in the casing so as to provide a means of conveniently connecting a flexible record strip to the rotatable member without dismembering the casing, means for automatically rotating said rotatable member so as to wind thereon the record strip and locking means for temporarily preventing the free end of the tongue from passing into the casing while the record strip is being attached to it.

2. A device for inclosing and readily displaying when required a record of telephone addresses or other information, comprising a protective casing having a slit in one of its walls for the passage into and out of the casing of a flexible strip for the record, a rotatable member within the casing, a tongue of flexible material secured at one end to the rotatable member and capable of extending therefrom at the other end through the slit in the casing so as to provide a means of conveniently connecting a flexible record strip to the rotatable member without dismembering the casing, a spring secured at one end to the rotatable member and at the other end to the casing for automatically rotating said rotatable member so as to wind thereon the record strip, and locking means on the tongue for temporarily preventing the free end of the tongue from passing into the casing while the record strip is being attached to it.

3. A device for inclosing and readily displaying when required a record of telephone addresses or other information, comprising a protective casing having a slit in one of its walls for the passage into and out of the casing of a flexible strip for the record, a rotatable spool within the casing, a tongue of flexible material secured at one end to the rotatable spool and capable of extending therefrom at the other end through the slit in the casing so as to provide a means of conveniently connecting a flexible record strip to the rotatable spool without dismembering the casing, a milled edge on one end of the spool, a stop slidable at will on the casing into and out from engagement with said milled edge so as temporarily to retain the spool against rotation, a spring secured at one end to the spool and at the other end to the casing for automatically rotating said spool so as to wind thereon a flexible record strip, and locking means on the tongue for temporarily preventing the free end of the tongue from passing into the casing while the record strip is being attached to it.

4. A device for inclosing and readily displaying when required a record of telephone addresses or other information, comprising a protective casing having a slit in one of its walls for the passage into and out of the casing of a flexible strip for the record, a rotatable spool within the casing, a tongue of flexible material secured at one end to the rotatable spool and capable of extending therefrom at the other end through the slit in the casing so as to provide a means of conveniently connecting a flexible record strip to the rotatable spool without dismembering the casing, a milled edge on one end of the spool, a stop slidable at will on the casing into and out from engagement with said milled edge so as temporarily to retain the spool against rotation, a spring secured at one end to the spool and at the other end to the casing for automatically rotating said spool so as to wind thereon a flexible record strip, locking means on the tongue for temporarily preventing the free end of the tongue from passing into the casing while the record strip is being attached to it, clamping means on the casing for clamping the device to the stem of a table telephone, and a flexible record strip provided at one end with means for securing it to the tongue aforesaid and at the other end with means for preventing the record strip from being drawn completely into the casing.

5. A device for inclosing and readily displaying when required a record of telephone addresses or other information, comprising a protective casing having a slit in one of its walls for the passage into and out of the casing of a flexible strip for the record, a rotatable member within the casing, a tongue of flexible material secured at one end to the rotatable member and capable of extending therefrom at the other end through the slit in the casing so as to provide a means of conveniently connecting a flexible record strip to the rotatable member without dismembering the casing, a spring secured at one end to the rotatable member and at the other end to the casing for automatically rotating said rotatable member so as to wind thereon the record strip, a rigid edge-piece secured along the free edge of the tongue, a series of wires disposed transversely to the tongue and secured to said edge-piece in close proximity to the surface thereof so that the end of a record strip may be threaded under and over the wires and thereby held frictionally in attachment to the tongue, and locking means on the tongue for temporarily preventing the free end of the tongue from passing into the casing while the record strip is being attached to it.

In testimony whereof we have signed our names to this specification.

RHYS GORDON THOMAS.
BLANCHE ELLIOTT.